US012668271B2

(12) United States Patent
Liu et al.

(10) Patent No.: US 12,668,271 B2
(45) Date of Patent: Jun. 30, 2026

(54) METHOD FOR IDENTIFYING TRAFFIC SIGNS, SYSTEM, AND VEHICLE

(71) Applicant: HON HAI PRECISION INDUSTRY CO., LTD., New Taipei (TW)

(72) Inventors: Tsung-Wei Liu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 286 days.

(21) Appl. No.: 18/399,977

(22) Filed: Dec. 29, 2023

(65) Prior Publication Data

US 2024/0227847 A1 Jul. 11, 2024

(30) Foreign Application Priority Data

Jan. 9, 2023 (CN) .......................... 202310028037.4

(51) Int. Cl.
*G06V 20/58* (2022.01)
*B60W 60/00* (2020.01)

(52) U.S. Cl.
CPC ......... *B60W 60/001* (2020.02); *G06V 20/582* (2022.01)

(58) Field of Classification Search
CPC . G06V 20/582; G06V 20/588; G08G 1/09623
See application file for complete search history.

(56) References Cited

U.S. PATENT DOCUMENTS

2019/0347940 A1* 11/2019 Endo ........................ B60Q 9/00
2020/0089224 A1* 3/2020 Kim ..................... G05D 1/0088
2024/0092381 A1* 3/2024 Kawano ............... G06V 20/582

* cited by examiner

*Primary Examiner* — Kenneth J Malkowski
(74) *Attorney, Agent, or Firm* — ScienBiziP, P.C.

(57) ABSTRACT

A method for identifying traffic signs is provided. The method obtains an image of a travel in front of vehicle. The method obtains an image of a first sign from the image of the travel and corresponding to a traffic lane where the vehicle current is, and obtains an image of a second sign from the image of the travel, associated with the image of the first sign, and on an image of a traffic sign according to the image of the first sign. The method determines an image of an association sign to be an image of an indicating sign on the traffic sign where the second sign is, and outputs a control signal to a driving system of the vehicle according to content of the image of the association sign. A related vehicle and a non-transitory storage medium are provided.

20 Claims, 8 Drawing Sheets

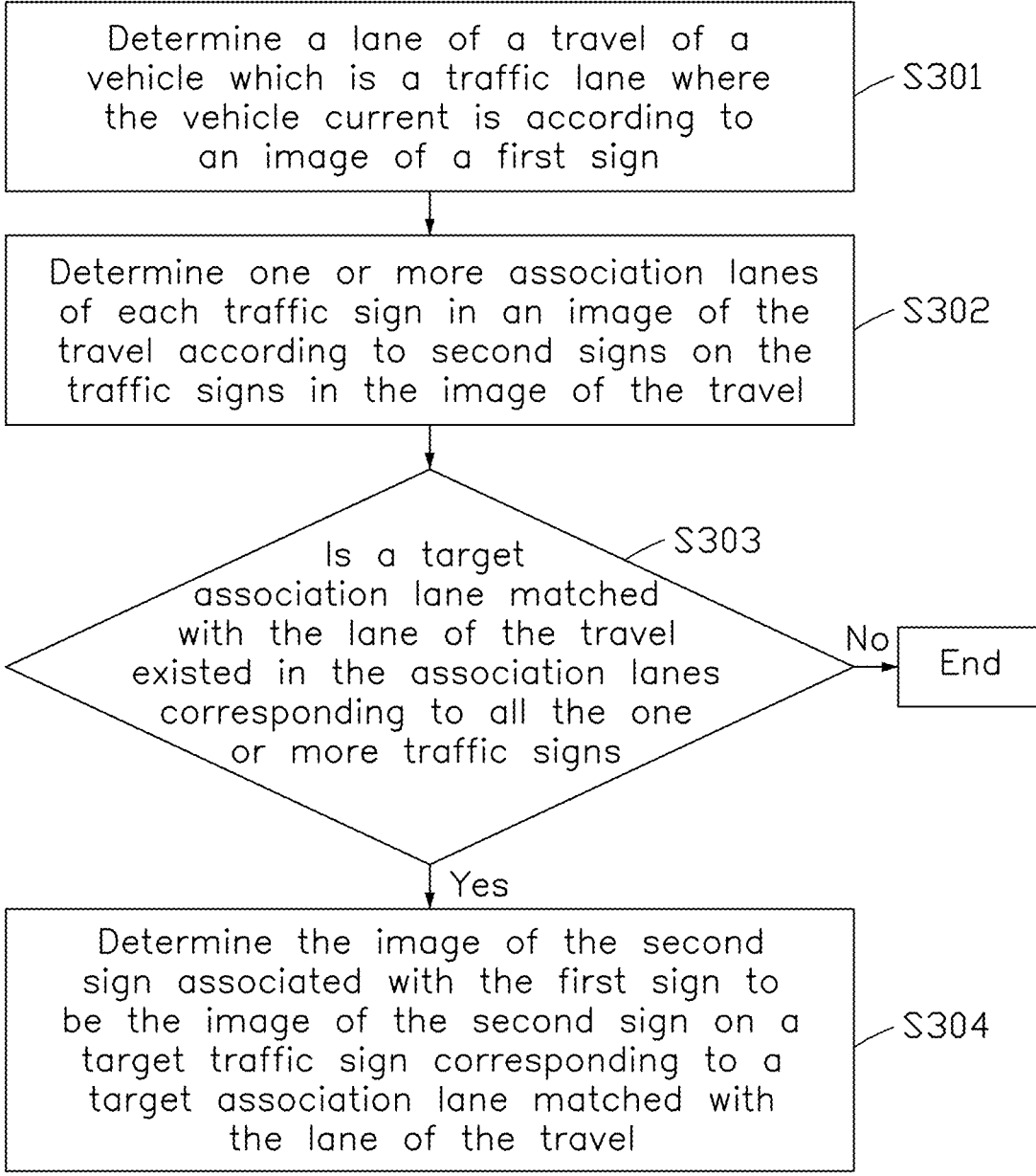

Determine a lane of a travel of a vehicle which is a traffic lane where the vehicle current is according to an image of a first sign — S301

Determine one or more association lanes of each traffic sign in an image of the travel according to second signs on the traffic signs in the image of the travel — S302

Is a target association lane matched with the lane of the travel existed in the association lanes corresponding to all the one or more traffic signs — S303

No → End

Yes

Determine the image of the second sign associated with the first sign to be the image of the second sign on a target traffic sign corresponding to a target association lane matched with the lane of the travel — S304

FIG. 3

Traffic sign

Second indicating graphic

Second assistance graphic

Second sign

METHOD FOR IDENTIFYING TRAFFIC SIGNS, SYSTEM, AND VEHICLE

FIELD

The subject matter herein generally relates to an intelligent transportation technology, and particularly to a method for identifying traffic signs, a system, and a vehicle.

BACKGROUND

Traffic signs are signs usually erected on or above traffic roads. The traffic signs include one or more speed limit signs, one or more direction signs of a travel of a lane, one or more traffic lights, and so on. During a travel of a vehicle on the traffic road, the vehicle needs to drive in accordance with traffic regulations designated by the traffic signs. Nowadays, a device such as an electronic navigation system or a driver assistance system, can capture an image during the travel of the vehicle, identify the traffic sign in the image, and prompt or per-warn the driver according to the identified traffic sign.

However, there are a number of traffic signs erected on or above the traffic road. Different traffic signs may have functions of traffic indication to different traffic lanes of the traffic road. Thus, the traffic signs in the same captured image may interfere with each other. The nowadays device can not accurately detect the traffic sign corresponding to a traffic lane where the vehicle current is, thus the travel of the vehicle may be interfered and influenced by the traffic signs which are not corresponding to the traffic lane where the vehicle current is.

SUMMARY

An embodiment of the present application provides a method for identifying traffic signs, a vehicle, and a storage medium which can accurately detect a traffic sign suitable for a current travel state of the vehicle from the traffic signs in a captured image, reduce an interference of complex traffic signs to a driving of the vehicle, thus an accuracy prompt to a driver or an accuracy control of a travel of the vehicle according to the traffic signs can be achieved.

In a first aspect, an embodiment of the present application provides a method for identifying traffic signs. The method obtains an image of a travel in front of vehicle captured during a travel of the vehicle. The image of the travel comprises one or more traffic lanes, one or more traffic signs, one or more first signs, one or more second signs, and one or more indicating signs arranged on each of the one or more traffic signs. Each of the one or more first signs is arranged on a corresponding traffic lane of the one or more traffic lanes. Each of the one or more second signs is arranged on a corresponding traffic sign of the one or more traffic signs. Each of the one or more second signs is configured to indicate at least one traffic lane associated with the corresponding traffic sign. The at least one traffic lane is from the one or more traffic lanes. The method obtains an image of the first sign corresponding to the traffic lane where the vehicle current is according to the image of the travel. The method obtains an image of the second sign which is associated with the first sign and is on the traffic sign according to the image of the first sign and the image of the travel. The method determines an image of one or more association signs which associate the traffic lane where the vehicle current is to be an image of the one or more indicating signs which are on the traffic sign where the second sign is according to the image of the second sign and the image of the travel. The method output a control signal to a driving system of the vehicle according to content of the image of the one or more association signs.

According to some embodiments of the present application, the method determines a lane of the travel of the vehicle which is the traffic lane where the vehicle current is according to the image of the first sign. The method determines one or more association lanes of each of the one or more traffic signs in the image of the travel according to the one or more second signs on the one or more traffic signs in the image of the travel. The method determines the image of the second sign associated with the first sign to be the image of the second sign on a target traffic sign corresponding to a target association lane if the target association lane is existed in the association lanes corresponding to all the one or more traffic signs. The target association lane is matched with the lane of the travel and the target traffic sign is from the one or more traffic signs.

According to some embodiments of the present application, the target association lane being matched with the lane of the travel represents that the target association lane and the lane of the travel indicate the same traffic lane.

According to some embodiments of the present application, each of the one or more first signs in the image of the travel comprises a first indicating graphic. The first indicating graphic is configured to indicate a position of one traffic lane corresponding to a corresponding first sign on a road. The one traffic lane is from the one or more traffic lanes. Each of the one or more second signs in the image of the travel comprises one or more second indicating graphics. The one or more second indicating graphics are configured to reflect one or more first indicating graphics, the one or more indicating graphics being at least one indicating graphic of the at least one traffic lane associated with a corresponding second sign.

According to some embodiments of the present application, each of the one or more first signs in the image of the travel further comprises one or more first assistance graphics. The one or more first assistance graphics in each of the one or more first signs are configured to indicate one or more positions of other traffic lanes excluding the one traffic lane corresponding to the first indicating graphic.

According to some embodiments of the present application, a total number of a first number of the first indicating graphic adding a second number of the one or more first assistance graphics in the image of the travel in each of the one or more first signs is the same as a number of the traffic lanes on the road. The first indicating graphic and the one or more first assistance graphics in the image of the travel in each of the one or more first signs are arranged according to a preset lane sequence. A first position of the first indicating graphic in the image of the travel in the preset lane sequence corresponds to the position of the one traffic lane where the corresponding first sign is on the road. The corresponding first sign includes the first indicating graphic. One or more second positions of the one or more first assistance graphics in the image of the travel in the preset lane sequence corresponds to one or more positions of other traffic lanes excluding the one traffic lane where the corresponding first sign is on the road.

According to some embodiments of the present application, each of the one or more second signs in the image of the travel further includes one or more second assistance graphics. The one or more second assistance graphics in each of the one or more second signs are configured to indicate one or more positions of other traffic lanes excluding the at least one traffic lane associated with the corresponding second sign. The corresponding second sign includes the one or more second assistance graphics. A total number of a third number of the one or more second indicating graphics adding a fourth number of the one or more second assistance graphics in the image of the travel in each of the one or more second signs is the same as a number of the traffic lanes on the road. The one or more second indicating graphics and the one or more second assistance graphics in the image of the travel in each of the one or more second signs are arranged according to a preset lane sequence. One or more third positions of the one or more second indicating graphics in the image of the travel in the preset lane sequence corresponds to at least one position of the at least one traffic lane where the corresponding second sign is on the road. The corresponding second sign includes the one or more second indicating graphics. One or more fourth positions of the one or more second assistance graphics in the image of the travel in the preset lane sequence corresponds to one or more positions of other traffic lanes excluding the at least one traffic lane where the corresponding second sign is on the road. The corresponding second sign includes the one or more second assistance graphics.

In a second aspect, an embodiment of the present application provides a vehicle. The vehicle includes a storage device and at least one processor. The storage device stores one or more programs, which when executed by the at least one processor, cause the at least one processor to obtain an image of a travel in front of vehicle captured during a travel of the vehicle. The image of the travel comprises one or more traffic lanes, one or more traffic signs, one or more first signs, one or more second signs, and one or more indicating signs arranged on each of the one or more traffic signs. Each of the one or more first signs is arranged on a corresponding traffic lane of the one or more traffic lanes. Each of the one or more second signs is arranged on a corresponding traffic sign of the one or more traffic signs. Each of the one or more second signs is configured to indicate at least one traffic lane associated with the corresponding traffic sign. The at least one traffic lane is from the one or more traffic lanes. The vehicle further causes the at least one processor to obtain an image of the first sign corresponding to the traffic lane where the vehicle current is according to the image of the travel. The vehicle further causes the at least one processor to obtain an image of the second sign which is associated with the first sign and is on the traffic sign according to the image of the first sign and the image of the travel. The vehicle further causes the at least one processor to determine an image of one or more association signs which associate the traffic lane where the vehicle current is to be an image of the one or more indicating signs which are on the traffic sign where the second sign is according to the image of the second sign and the image of the travel. The vehicle further causes the at least one processor to output a control signal to a driving system of the vehicle according to content of the image of the one or more association signs.

In a third aspect, an embodiment of the present application provides a non-transitory storage medium. The non-transitory storage medium stores a set of commands, when the commands being executed by at least one processor of a vehicle, causing the at least one processor to obtain an image of a travel in front of vehicle captured during a travel of the vehicle. The image of the travel comprises one or more traffic lanes, one or more traffic signs, one or more first signs, one or more second signs, and one or more indicating signs arranged on each of the one or more traffic signs. Each of the one or more first signs is arranged on a corresponding traffic lane of the one or more traffic lanes. Each of the one or more second signs is arranged on a corresponding traffic sign of the one or more traffic signs. Each of the one or more second signs is configured to indicate at least one traffic lane associated with the corresponding traffic sign. The at least one traffic lane is from the one or more traffic lanes. The non-transitory storage medium further causes the at least one processor to obtain an image of the first sign corresponding to the traffic lane where the vehicle current is according to the image of the travel. The non-transitory storage medium further causes the at least one processor to obtain an image of the second sign which is associated with the first sign and is on the traffic sign according to the image of the first sign and the image of the travel. The non-transitory storage medium further causes the at least one processor to determine an image of one or more association signs which associate the traffic lane where the vehicle current is to be an image of the one or more indicating signs which are on the traffic sign where the second sign is according to the image of the second sign and the image of the travel. The non-transitory storage medium further causes the at least one processor to output a control signal to a driving system of the vehicle according to content of the image of the one or more association signs.

The disclosure can identify the first sign on the traffic lane where the vehicle current is current in and the second signs on the traffic signs from the image of the travel, and match according to a result of the identification, thus the one or more association signs associated with the traffic lane where the vehicle current is are obtained, and a corresponding control signal can be output to the driving system of the vehicle via identifying the one or more association signs.

In a condition of a number of expansive and complex traffic signs erected on or above the road, the method can accurately detect the traffic sign suitable for the current travel state of the vehicle from the traffic signs, an interference and an influence on the travel of the vehicle by the traffic signs which are not correspond to the traffic lane where the vehicle current is. Thus, an accuracy prompt to a driver or an accuracy control of the travel of the vehicle according to the traffic signs can be achieved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 3 is a view of an embodiment of a process of a step S103 of a method for identifying traffic signs.

DETAILED DESCRIPTION

Figure 1:
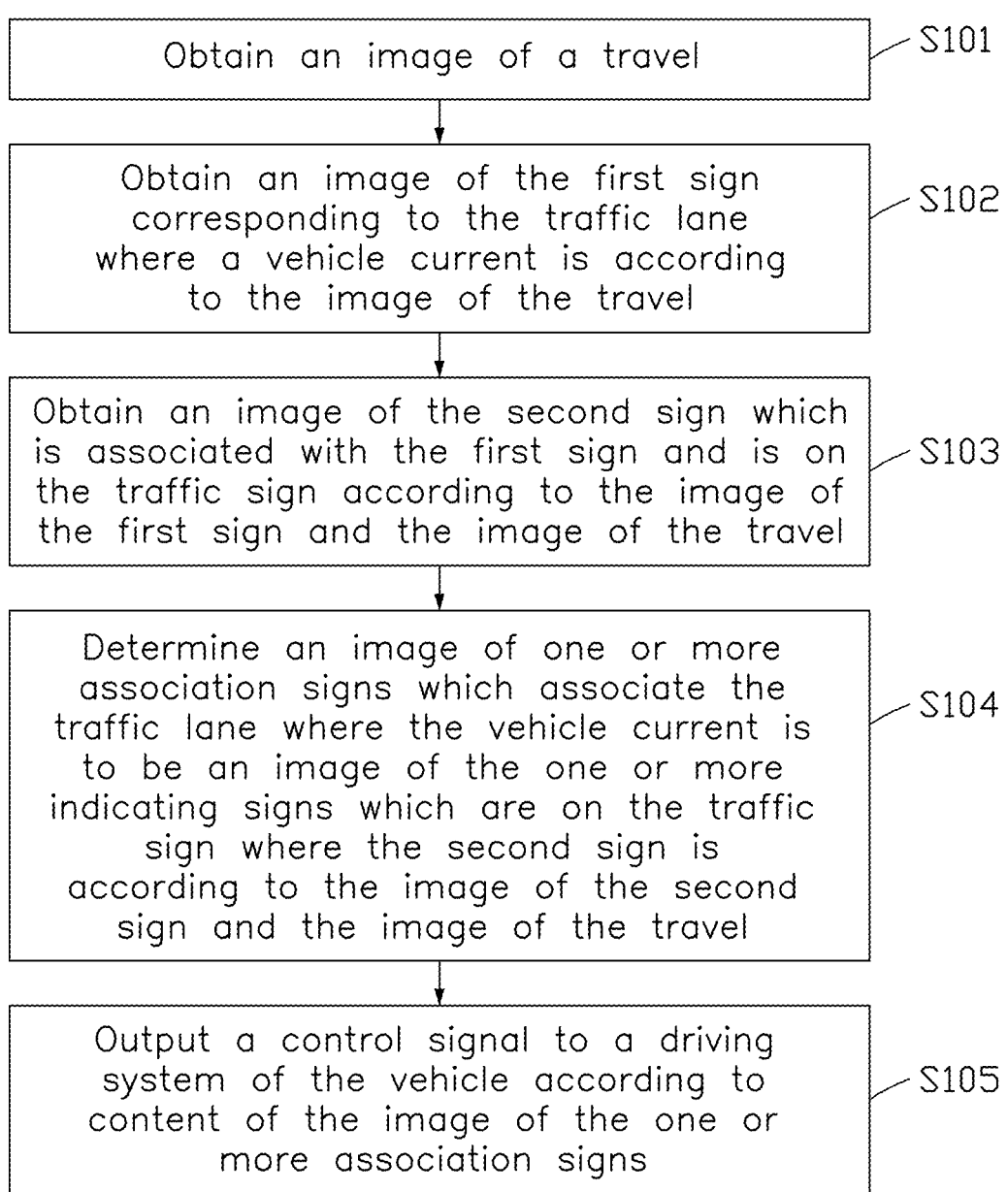
FIG. 1 is a flowchart of an embodiment of a method for identifying traffic signs.

Objects, technical solutions and advantages of embodiments of the present application will be clearer from a clear and complete description of technical solutions of the present application in connection with the drawings. Apparently, the described embodiments are part, not all, of the embodiments of the present application.

In the following description, reference numerals, such as S101 and S102 . . . , of related steps do not indicate that the steps are necessarily performed in such an order. Where permitted, steps may be performed in a reversed order or at the same time. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Unless otherwise defined, all technical and scientific terms used in this specification have a same meaning as those commonly understood by a person skilled in the art of this application. In case of inconsistency, a meaning specified in this specification or derived from content specified in this specification is used. In addition, terms used in this specification are merely intended to describe embodiments of this application, and are not intended to limit this application.

Referring to FIG. 1, a method for identifying traffic signs is shown. Furthermore, the illustrated order of blocks is illustrative only and the order of the blocks can change. Additional blocks can be added, or fewer blocks may be utilized, or the order of the blocks may be changed, without departing from this disclosure. The method includes:

S101, obtaining an image of a travel.

The image of the travel is the image in front of vehicle captured during a travel of the vehicle. The image of the travel includes one or more traffic lanes, one or more traffic signs, a first sign arranged on each traffic lane, a second sign arranged on each traffic sign, and one or more indicating signs arranged on each traffic sign. Namely, the image of the travel includes one or more traffic lanes at each of which the first sign is arranged, and one or more traffic signs at each of which the second sign and the one or more indicating signs are arranged.

In the embodiment, the one or more traffic lanes are feasible areas on the road which are partitioned by a number of lane lines. Each road may include a number of traffic lanes.

Each first sign is an indicator arranged on a surface of the traffic lane in advance. The first sign is configured to indicate the traffic lane where the first sign is arranged. Each traffic lane corresponds to one first sign, and different traffic lanes in the same road correspond to different first sign. Thus, the traffic lanes can be distinguished via the first signs.

Each traffic sign is a content sign erected on or above the road and which has a function of traffic management indication to the vehicles travelled on the one or more traffic lanes. Each traffic sign includes the content, for example, speed limit content (vehicle speed limit content), direction content of the travel of the lane. The content can be reflected by the one or more indicating signs.

Each second sign is an indicator arranged on a surface of the traffic sign in advance. Each second sign is configured to indicate the one or more traffic lanes associated with the traffic sign. Each traffic sign corresponds to one second sign. Thus, whether the traffic lanes on the road are regulated by the traffic signs can be distinguished by the second signs arranged on the traffic signs.

It can be understood that, each traffic sign can be an object capable of displaying the sign content, such as a sign plate or a display screen. An indicating sign and a second sign can be arranged on the traffic sign, or a pair of indicating signs and a second sign can be arranged on the traffic sign, or a number of pairs of indicating signs and the second sign can be arranged on the traffic sign. The one or more indicating signs and a corresponding second sign can be distinguished from each other. The disclosure is not limited herein.

Figure 2A:
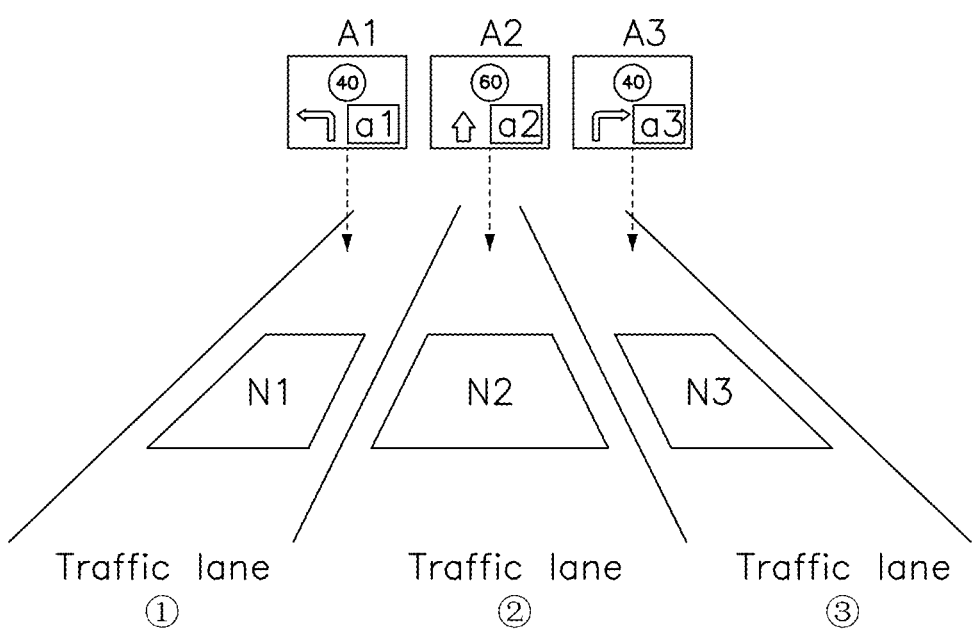
FIGS. 2A and 2B are views of embodiments of a lane scenario α and a lane scenario β.

Referring to FIG. 2A, as an example, in the lane scenario α, according to the image of the travel, the road includes three traffic lanes, and three traffic sign plates are erected on or above the road. Three traffic lanes are arranged on a sequence of "left", "center", and "right". One first sign is arranged on each traffic lane.

Where, a first sign N1 can be arranged on the traffic lane ① which is on the left side. A first sign N2 can be arranged on the traffic lane ② which is on the center. A first sign N3 can be arranged on the traffic lane ③ which is on the right side.

The positions of three traffic sign plates are arranged on a sequence of "left", "center", and "right". Each traffic sign plate includes an indicating sign of speed limit, an indicating sign of direction sign of the travel of the lane, and the second sign. Each traffic sign plate forms a traffic sign, and the second sign on the traffic sign plate is the second sign corresponding to the traffic sign.

Where, a second sign a1 can be arranged on the traffic sign A1 which is on the left side, and the traffic sign A1 is configured to indicate the content of traffic management of the traffic lane ①, thus the traffic sign A1 is associated with the traffic lane ①.

A second sign a2 can be arranged on the traffic signal A2 which is on the center, and the traffic signal A2 is configured to indicate the content of traffic management of the traffic lane ②, thus the traffic sign A2 is associated with the traffic lane ②.

A second sign a3 can be arranged on the traffic signal A3 which is on the right side, and the traffic signal A3 is configured to indicate the content of traffic management of the traffic lane ③, thus the traffic sign A3 is associated with the traffic lane ③.

Figure 2B:
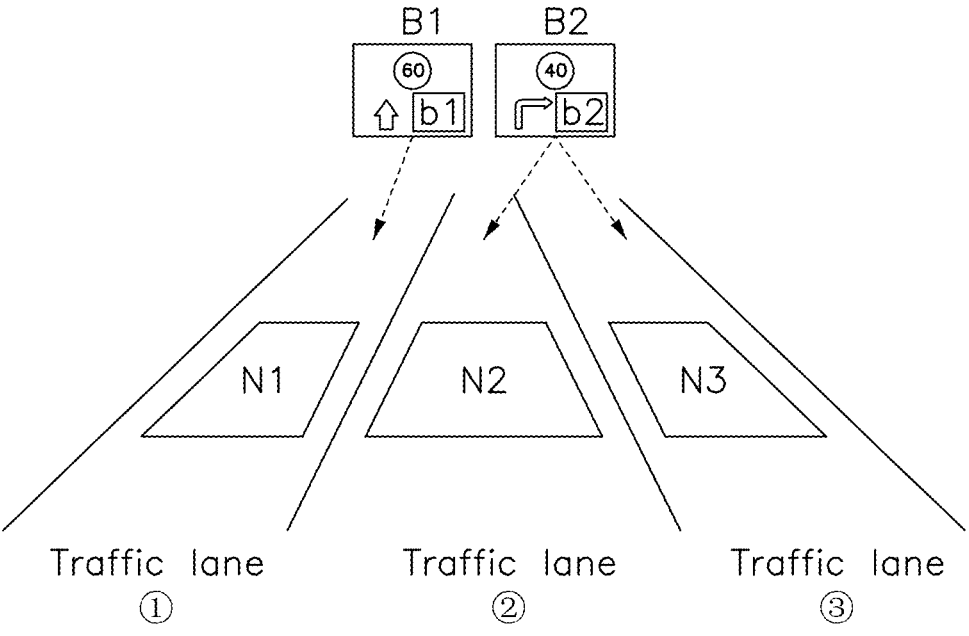

Referring to FIG. 2B, as an example, in the lane scenario β, according to the image of the travel, the road includes three traffic lanes, and two traffic sign plates are erected on or above the road. Three traffic lanes are arranged on a sequence of "left", "center", and "right". One first signal is arranged on each traffic lane.

Where, a first sign N1 can be arranged on the traffic lane ① which is on the left side. A first sign N2 can be arranged on the traffic lane ② which is on the center. A first sign N3 can be arranged on the traffic lane ③ which is on the right side.

The positions of two traffic sign plates are arranged on a sequence of "left" and "right". Each traffic sign plate includes an indicating sign of speed limit, an indicating sign of direction sign of the travel of the lane, and the second sign. Each traffic sign plate forms a traffic sign, and the second sign on the traffic sign plate is the second sign corresponding to the traffic sign.

Where, a second sign b1 can be arranged on the traffic sign B1 which is on the left side, and the traffic sign B1 is configured to indicate the content of traffic management of the traffic lane ①, thus the traffic sign B1 is associated with the traffic lane ①.

A second sign b2 can be arranged on the traffic signal B2 which is on the right side, and the traffic signal B2 is configured to indicate the content of traffic management of the traffic lane ② and the content of traffic management of the traffic lane ③, thus the traffic sign B2 is associated with the traffic lane ② and the traffic lane ③.

In some embodiments, the image of the travel can be the image captured by a driving recorder. In some embodiments, the image of the travel can be the image captured by a camera external to the vehicle, or the image obtained from a video captured by the camera external to the vehicle. The device capturing the image of the travel and a capturing angle of the image of the travel are not limited herein, as long as the image of the travel can reflect the traffic lane, the traffic sign, the first sign, and the second sign.

Referring back to FIG. 1, S102, obtaining an image of the first sign corresponding to the traffic lane where the vehicle current is according to the image of the travel.

Where, the first sign in the image of the travel can reflect the traffic lane where the vehicle current is. The first sign in the image of the travel can be an identification of the traffic lane. In the image of the travel, different travel lanes correspond to different first signs.

In some embodiments, in the image of the travel, different first signs can be distinguished via different patterns. Different traffic lanes can be divided by a number of preset lane indexes. The lane indexes are arranged according to an arrangement sequence of the traffic lanes in the road. A relationship between the first signs and the traffic signs can be recorded via a relationship mapping table, and the relationship can be stored in a storage unit.

Referring to FIG. 2A, referring to the aforementioned example, in the image of the travel, in the lane scenario α, the first sign N1 can be arrange on the traffic lane ① which is on the left side. The first sign N2 can be arranged on the traffic lane ② which is on the center. The first sign N3 can be arranged on the traffic lane ③ which is on the right side.

Relationships between the first signs and the traffic lanes can be, the first sign N1 corresponding to the traffic lane ①, the first sign N2 corresponding to the traffic lane ②, the first sign N3 corresponding to the traffic lane ③.

Referring to FIG. 2B, referring to the aforementioned example, in the image of the travel, in the lane scenario β, the first sign N1 can be arrange on the traffic lane ① which is on the left side. The first sign N2 can be arranged on the traffic lane ② which is on the center. The first sign N3 can be arranged on the traffic lane ③ which is on the right side.

Relationships between the first signs and the traffic lanes can be, the first sign N1 corresponding to the traffic lane ①, the first sign N2 corresponding to the traffic lane ②, and the first sign N3 corresponding to the traffic lane ③.

In some embodiments, a detail of identifying the first sign on the traffic lane where the vehicle is from the image of the travel can include, identifying the first sign in the image of the travel via a target detection and recognition algorithm, to identify one or more first signs.

If the vehicle travels on the traffic lane ①, the first sign N1 should be in front of the vehicle, and the first sign N1 should be in a front region in the image of the travel, thus in the image of the travel, the identified first sign can be the traffic lane ①, and the traffic lane where the vehicle current is can be the traffic lane ① according to the relationship between the first signs and the traffic signs. Similarly, if the first sign identified from the image of the travel can be the first sign N2, the traffic lane where the vehicle current is can be the traffic lane ②. If the first sign identified from the image of the travel can be the first sign N3, the traffic lane where the vehicle current is can be the traffic lane ③.

Where, the front region can be a pre-defined region in the image of the travel. The front region can be configured to reflect the region of the position in front of the vehicle in the image of the travel.

In the embodiment, the traffic lane where the vehicle current is can be determined via identifying the first sign on the traffic lane where the vehicle current is in the image of the travel. No lane recognition algorithm is needed to recognize the traffic lane where the vehicle current is. Thus, the image of the travel cannot include all the traffic lanes of the road, and all the traffic lanes of the road need not be captured, a shooting requirement on the image of the travel is lower, and the recognition can be achieved only need that the image of the travel includes the first sign.

In some embodiments, a detail of identifying the first sign on the traffic lane where the vehicle is in the image of the travel can include, 1) detecting the traffic lane where the vehicle current is from the image of the travel via the lane recognition algorithm; 2) obtaining an image area of the traffic lane where the vehicle current is; and 3) identifying the first sign in the image area in the image of the travel via the target detection and recognition algorithm.

Referring back to FIG. 1, S103, obtaining an image of the second sign which is associated with the first sign and is on the traffic sign according to the image of the first sign and the image of the travel.

Where, the method can match the first sign on the traffic lane where the vehicle current is with the second signs on the traffic signs, and obtain the image of the second sign associated with the first sign from the images of the second sign on the traffic sign according to a matching result.

In the embodiment, if the second sign and the first sign can indicate the same traffic lane, the image of the second sign is associated with the image of the first sign.

S104, determining an image of one or more association signs which associate the traffic lane where the vehicle current is to be an image of the one or more indicating signs which are on the traffic sign where the second sign is according to the image of the second sign and the image of the travel.

Where, the one or more association signs are the indicating signs associated with the traffic lane where the vehicle current is.

In the image of the travel, each second sign can reflect the one or more traffic lanes associated with the traffic sign. The method can obtain the one or more indicating signs on the traffic sign of a lane of the travel via a matching between the first sign and the second sign and a relevance between the second signs and the indicating signs, namely obtain the one or more association signs.

It can be understood that, in the image of the travel, the association signs are the indicating signs each of which has a function of the traffic management indication on the traffic lane where the vehicle is. When the vehicle is travelled, the association signs should be noted.

S105, outputting a control signal to a driving system of the vehicle according to content of the image of the one or more association signs.

Where, the content of the one or more association signs can reflect the content of the traffic management indicated by the one or more association signs, for example, a speed limit, a direction of the travel of the lane, and so on.

In the embodiment, the method can further recognize the content of the one or more association signs. A detail of recognizing the content of the one or more association signs can include, employing a semantic recognition to recognize the content of the one or more association signs, to obtain the content of the one or more association signs.

In some embodiments, if the one or more association signs associated with the traffic lane where the vehicle current is include a speed limit sign, the content of the one or more association signs is a speed limit of the vehicle currently travelling in the traffic lane, and a control signal of a speed limit can be output to the driving system of the vehicle according to the content of the one or more association signs.

If the one or more association signs associated with the traffic lane where the vehicle current is include a direction sign of the travel, the content of the one or more association signs is a direction of the travel of the vehicle currently travelling in the traffic lane, and a control signal of a direction of the travel can be output to the driving system of the vehicle according to the content of the one or more association signs.

If the one or more association signs associated with the traffic lane where the vehicle current is include the speed limit sign and the direction sign of the travel, the content of the one or more association signs is a speed limit of the vehicle currently travelling in the traffic lane and a direction of the travel of the vehicle currently travelling in the traffic lane, and a corresponding control signal of the speed limit and a corresponding control signal of the direction of the travel can be output to the driving system of the vehicle according to the content of the one or more association signs.

In the embodiment, after the one or more control signals are output to the driving system of the vehicle, the driving system can make different decisions according to the one or more control signals. For example, the driving system can display prewarning information on a display device according to the one or more control signals, to prompt a driver that one or more traffic signs are existed on the traffic lane where the vehicle current is, and display a detail speed limit corresponding to the control signal of the speed limit and/or a detail direction of the travel corresponding to the control signal of the direction of the travel.

In some embodiments, the driving system can control a travel state of the vehicle according to the one or more control signals, for example adjusting a speed of a travel of the vehicle according to the control signal of the speed limit, and changing the lane where the vehicle is according to the control signal of the direction of the travel, and so on.

Referring to FIGS. 2A, 2B, and 3, in some embodiments, S103, obtaining the image of the second sign which is associated with the first sign and is on the traffic sign according to the image of the first sign and the image of the travel, includes:

S301, determining the lane of the travel of the vehicle which is the traffic lane where the vehicle current is according to the image of the first sign.

The lane of the travel can be obtained via identifying the image of the first sign.

S302, determining one or more association lanes of each traffic sign in the image of the travel according to the second signs on the traffic signs in the image of the travel.

Where, the association lanes are the one or more traffic lanes associated with each traffic sign. And when there is a number of the traffic lanes associated with each traffic sign in the image of the travel, there is a number of the association lanes of each traffic sign in the image of the travel.

In the embodiment, in the image of the travel, different second signs can be distinguished via different patterns. In the image of the travel, different traffic lanes can be divided by a number of preset lane indexes. In the image of the travel, the lane indexes are arranged according to an arrangement sequence of the traffic lanes in the road. A relationship between the second signs and the traffic lanes can be recorded via a relationship mapping table, and be stored in the storage unit.

Referring to FIG. 2A, referring to the aforementioned example, in the image of the travel, in the lane scenario $\alpha$, the traffic sign A1 which the second sign a1 is on is associated with the traffic lane ①, the traffic sign A2 which the second sign a2 is on is associated with the traffic lane ②, the traffic sign A3 which the second sign a3 is on is associated with the traffic lane ③.

Thus, a relationship between the second signs and the traffic lanes in the image of the travel can include that, the second sign a1 corresponds to the traffic lane ①, the second sign a2 corresponds to the traffic lane ②, and the second sign a3 corresponds to the traffic lane ③.

Further, in the image of the travel, the one or more association lanes of the traffic sign A1 can include the traffic lane ① via identifying the second sign a1 on the traffic sign A1. In the image of the travel, the one or more association lanes of the traffic sign A2 can include the traffic lane ② via identifying the second sign a2 on the traffic sign A2. In the image of the travel, the one or more association lanes of the traffic sign A3 can include the traffic lane ③ via identifying the second sign a3 on the traffic sign A3.

Referring to FIG. 2B, referring to the aforementioned example, in the image of the travel, in the lane scenario $\beta$, the traffic sign B1 which the second sign b1 is on is associated with the traffic lane ①. The traffic sign B2 which the second sign b2 is on is associated with the traffic lane ② and the traffic lane ③.

Thus, a relationship between the second signs and the traffic lanes in the image of the travel can include that, the second sign b1 corresponds to the traffic lane ①, the second signal b2 corresponds to the traffic lane ② and the traffic lane ③.

Further, in the image of the travel, the one or more association lanes of the traffic sign B1 can includes the traffic lane ① via identifying the second sign b1 on the traffic sign B1. In the image of the travel, the one or more association lanes of the traffic sign B2 can includes the traffic lane ② and the traffic lane ③ via identifying the second sign b2 on the traffic sign B2.

In some embodiments, a detail of identifying the second sign on each traffic sign in the image of the travel can include, identifying the traffic signs and the second signs in the image of the travel via the target detection and recognition algorithm, to identifying one or more traffic signs, and identify the second sign corresponding to each traffic sign. The target detection and recognition algorithm can employ an instant segmentation algorithm.

Referring to FIG. 3, S303, determining whether a target association lane matched with the lane of the travel is existed in the association lanes corresponding to all the one or more traffic signs. If the target association lane matched with the lane of the travel is existed in the association lanes corresponding to all the one or more traffic signs, the procedure goes to step S304. If the target association lane matched with the lane of the travel is not existed in the association lanes corresponding to all the one or more traffic signs, the procedure goes to an end.

Where, if the target association lane and the lane of the travel can indicate the same traffic lane, the target association lane is matched with the lane of the travel. Namely, the target association lane being matched with the lane of the travel represents that the target association lane and the lane of the travel indicate the same traffic lane.

S304, determining the image of the second sign associated with the first sign to be the image of the second sign on a target traffic sign corresponding to a target association lane matched with the lane of the travel.

Where, the lane of the travel indicates the traffic lane where the vehicle is. When the target association lane matches with the lane of the travel, the second sign corresponding to the target association lane matched with the lane of the travel is associated with the traffic lane where the vehicle current is, thus the image of the second sign corresponding to the target association lane can be the image of the second sign associated with the first sign. And, in sequence steps, in the image of the travel, the one or more indicating signs corresponding to the second sign can be the one or more association signs corresponding to the first sign.

Referring to FIG. 2A, referring to the aforementioned example, in the image of the travel, in the lane scenario α, via the aforementioned steps of recognizing and processing the content in the image of the travel, the association lane of the traffic sign A1 is the traffic lane ① according to the second sign a1. The association lane of the traffic sign A2 is the traffic lane ② according to the second sign a2. The association lane of the traffic sign A3 is the traffic lane ③ according to the second sign a3.

If the first sign N1 is arranged on the traffic lane where the vehicle current is in the image of the travel, the current lane of the travel of the vehicle can be the traffic lane ①, and the second sign a1 is associated with the first sign N1 in the image of the travel. In the following steps, in the image of the travel, the one or more association signs can be the one or more indicating signs on the traffic sign A1, and a corresponding control signal can be output according to the one or more indicating signs on the traffic sign A1.

If the first sign N2 is arranged on the traffic lane where the vehicle current is in the image of the travel, the current lane of the travel of the vehicle can be the traffic lane ②, and the second sign a2 is associated with the first sign N2 in the image of the travel. In the following steps, in the image of the travel, the one or more association signs can be the one or more indicating signs on the traffic sign A2, and a corresponding control signal can be output according to the one or more indicating signs on the traffic sign A2.

If the first sign N3 is arranged on the traffic lane where the vehicle current is in the image of the travel, the current lane of the travel of the vehicle can be the traffic lane ③, and the second sign a3 is associated with the first sign N3 in the image of the travel. In the following steps, in the image of the travel, the one or more association signs can be the one or more indicating signs on the traffic sign A3, and a corresponding control signal can be output according to the one or more indicating signs on the traffic sign A3.

Referring to FIG. 2B, referring to the aforementioned example, in the image of the travel, in the lane scenario β, via the aforementioned steps of recognizing and processing the content in the image of the travel, the association lane of the traffic sign B1 is the traffic lane ① according to the second sign b1. The association lane of the traffic sign B2 is the traffic lane ② and the traffic lane ③ according to the second sign b2.

If the first sign N1 is arranged on the traffic lane where the vehicle current is in the image of the travel, the current lane of the travel of the vehicle can be the traffic lane ①, and the second sign b1 is associated with the first sign N1 in the image of the travel. In the following steps, in the image of the travel, the one or more association signs can be the one or more indicating signs on the traffic sign B1, and a corresponding control signal can be output according to the one or more indicating signs on the traffic sign B1.

If the first sign N2 is arranged on the traffic lane where the vehicle current is in the image of the travel, the current lane of the travel of the vehicle can be the traffic lane ②, the second sign b2 is associated with the first sign N2 in the image of the travel. In the following steps, in the image of the travel, the one or more association signs can be the one or more indicating signs on the traffic sign B2, and a corresponding control signal can be output according to the one or more indicating signs on the traffic sign B2.

If the first sign N3 is arranged on the traffic lane where the vehicle current is in the image of the travel, the current lane of the travel of the vehicle can be the traffic lane ③, and the second sign b2 is associated with the first sign N3 in the image of the travel. In the following steps, in the image of the travel, the one or more association signs can be the one or more indicating signs on the traffic sign B2, and a corresponding control signal can be output according to the one or more indicating signs on the traffic sign B2.

Figure 4A:
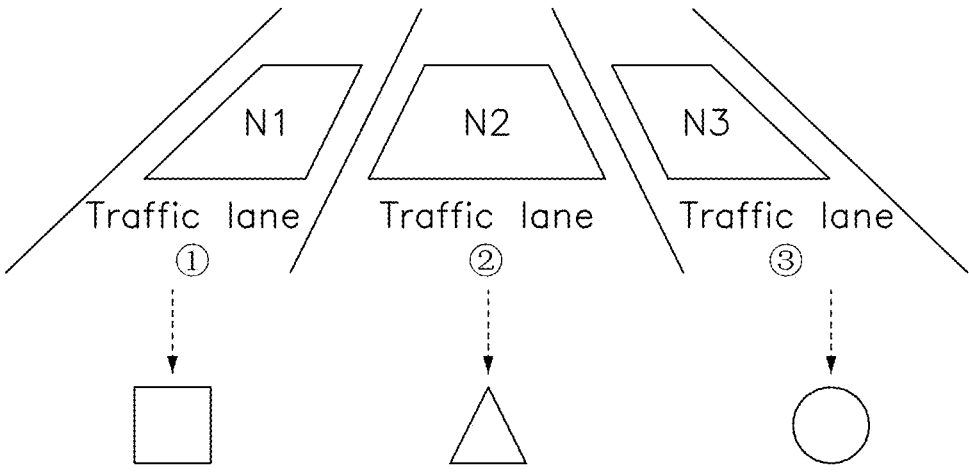
FIGS. 4A and 4B are views of an embodiment of some traffic lanes and some first signs.
Figure 4B:
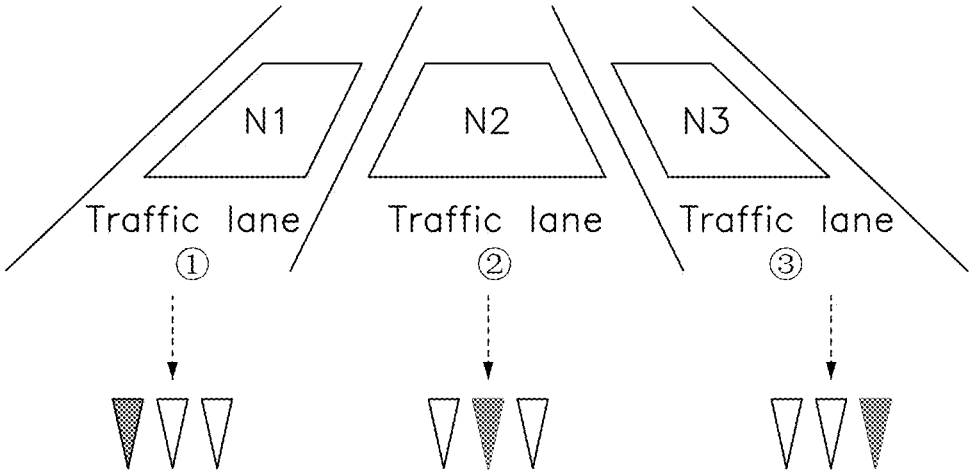

Referring to FIGS. 4A and 4B, details of the first sign and the second sign in the image of the travel are shown. The first sign includes a first indicating graphic. The first indicating graphic is configured to indicate a position of one traffic lane corresponding to a corresponding first sign on the road. The one traffic lane is from the one or more traffic lanes.

In some embodiments, the first indicating graphic can indicate the traffic lane via some elements, such as a shape, a color, a position, a filling level, or the like. For different first indicating graphics, different traffic lanes can be distinguished via different shapes, different colors, different positions, different filling levels, or the like.

Referring to FIG. 4A, for example, for different first indicating graphics having different shapes, the first sign N1 including a rectangle first indicating graphic can indicate the traffic lane ①. The first sign N2 including a triangle first indicating graphic can indicate the traffic lane ②. The first sign N3 including a round first indicating graphic can indicate the traffic lane ③.

Referring to FIG. 4B, for example, for different first indicating graphics having different positions, each first sign includes a number of graphics which includes the first indicating graphic. The number of the graphics in each first sign is the same as a number of the traffic lanes. A position of the first indicating graphic in the graphics of each first sign corresponds to a position of the traffic lane in the road.

Where, the first indicating graphic and the other graphic in the graphics of each first sign can be distinguished via different filling levels, for example the first indicating graphic is a solid triangle, the other graphics each is an open triangle. Thus, the first sign N1 that the first indicating graphic is on the left side can indicate the traffic lane ①. The first sign N2 that the first indicating graphic is on the center can indicate the traffic lane ②. The first sign N3 that the first indicating graphic is on the right side can indicate the traffic lane ③.

It can be understood that, the elements in the first indicating graphics can be set or combined according to an actual requirement, as long as the different first signs can be distinguished.

Figure 5:
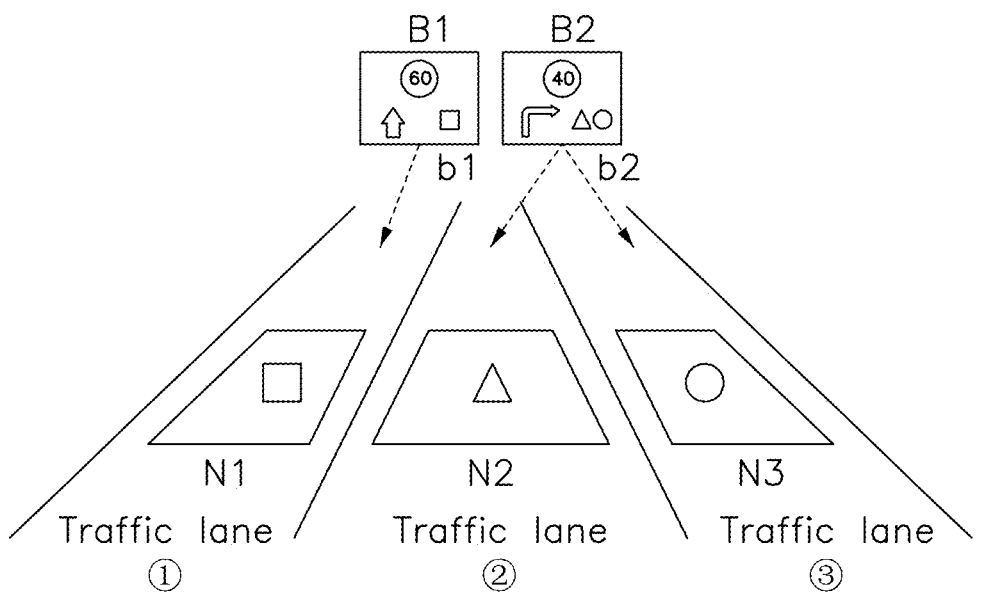
FIG. 5 is a view of an embodiment of correspondence relations between traffic signs and traffic lanes in a lane scenario α, where each correspondence relation is reflected via a virtual arrow.

Referring to FIG. 5, each second sign includes one or more second indicating graphics. The one or more second indicating graphics are configured to reflect the first indicating graphics of the at least one traffic lanes associated with a corresponding second sign.

In some embodiments, each second indicating graphic is the same as one corresponding first indicating graphic. All the second indicating graphics included in each second sign are a combination of the one or more first indicating graphics of the one or more first signs on all the traffic lanes associated with the traffic sign.

For example, in the image of the travel, in the lane scenario β, the road includes three traffic lanes, and two traffic signs are erected on or above the road. The first sign N1 including a rectangle first indicating graphic can indicate the traffic lane ①. The first sign N2 including a triangle first indicating graphic can indicate the traffic lane ②. The first sign N2 including a round first indicating graphic can indicate the traffic lane ③.

Where, in the image of the travel, the traffic sign B1 is associated with the traffic lane ①, thus the second sign b1 includes a rectangle first indicating graphic. The traffic sign B2 is associated with the traffic lane ② and the traffic lane ③, thus the second sign b2 includes a triangle first indicating graphic and a round first indicating graphic.

Figure 6:
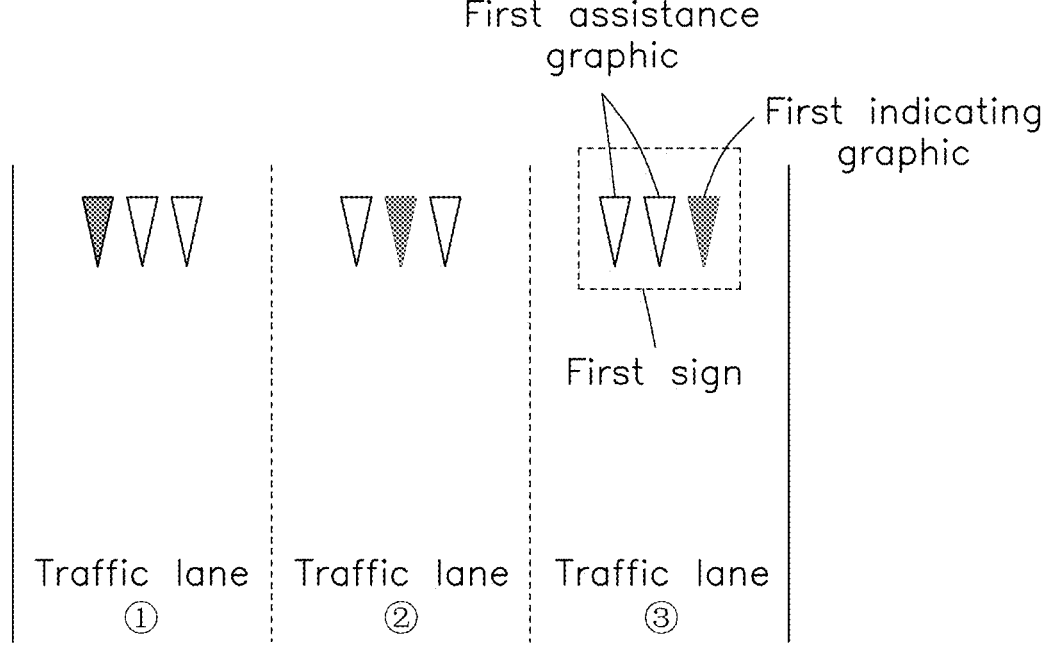
FIG. 6 is a view of an embodiment of traffic lanes, first signs, and one or more first indicating graphic and one or more first assistance graphics in each first sign.

Referring to FIG. 6, in some embodiments, each first sign further includes one or more first assistance graphics. The one or more first assistance graphics in each first sign are configured to indicate one or more positions of other traffic lanes of the road excluding the one traffic lane corresponding to the first indicating graphic. Each first indicating graphic and one or more corresponding first assistance graphics can be distinguished via some elements such as a shape, a color, a position, a filling level, or the like.

A total number of a first number of the first indicating graphic adding a second number of the one or more first assistance graphics in the image of the travel in each first sign is the same as a number of the traffic lanes on the road. And the first indicating graphic and the one or more first assistance graphics in the image of the travel in each first sign can be arranged according to a preset lane sequence. The preset lane sequence is arranged according to an arrangement sequence of the traffic lanes in the road.

In the embodiment, a first position of the first indicting graphic in the image of the travel in the preset lane sequence can correspond to the position of one the traffic lane where the corresponding first sign including the first indicating graphic is on the road. One or more second positions of one or more first assistance graphics in the image of the travel in the preset lane sequence can correspond to one or more positions of other traffic lanes excluding the one traffic lane where the corresponding first sign including the first assistance graphic is on the road.

For example, in the image of the travel, in the lane scenario β, the road includes three traffic lanes. Each first sign can include a first indicating graphic and two first assistance graphics. A shape of the first indicating graphic and shapes of the first assistance graphics each is triangle.

Where, the first indicating graphic and the first assistance graphics can be distinguished via different filling levels, for example, the first indicating graphic is a solid graphic, each first assistance graphic is an open triangle.

The first sign N1 is arranged on the traffic lane ① in the image of the travel, thus the first indicating graphic (the solid triangle), the first assistance graphic (the open triangle), and the first assistance graphic (the open triangle) are arranged in the first sign N1 according to the lane sequence in the image of the travel.

The first sign N2 is arranged on the traffic lane ② in the image of the travel, thus the first assistance graphic (the open triangle), the first indicating graphic (the solid triangle), and the first assistance graphic (the open triangle) are arranged in the first sign N2 according to the lane sequence in the image of the travel.

The first sign N3 is arranged on the traffic lane ③ in the image of the travel, thus the first assistance graphic (the open triangle), the first assistance graphic (the open triangle), and the first indicating graphic (the solid triangle) are arranged in the first sign N3 according to the lane sequence in the image of the travel.

Using a setting manner of each first sign, the number of the traffic lanes in the road can be obtained via identifying a total number of the first indicating graphic and the first assistance graphics. The current lane of the driving can be obtained via identifying a position of the first indicating graphic in the first sign. Thus, an identifying efficiency of a machine detection can be efficiently improved and it is convenient for the driver to identify during the travel.

It can be understood that, each first indicating graphic can indicate a corresponding traffic lane via a relative position of the first indicating graphic in the first sign. And, each first indicating graphic and the corresponding one or more first assistance graphics can be distinguished via different patterns (for example the filling levels). In the other embodiments, each first indicating graphic and the corresponding one or more first assistance graphics can be distinguished via other elements, for example different shapes, different colors, or the like, and the disclosure is not limited herein.

Figure 7:
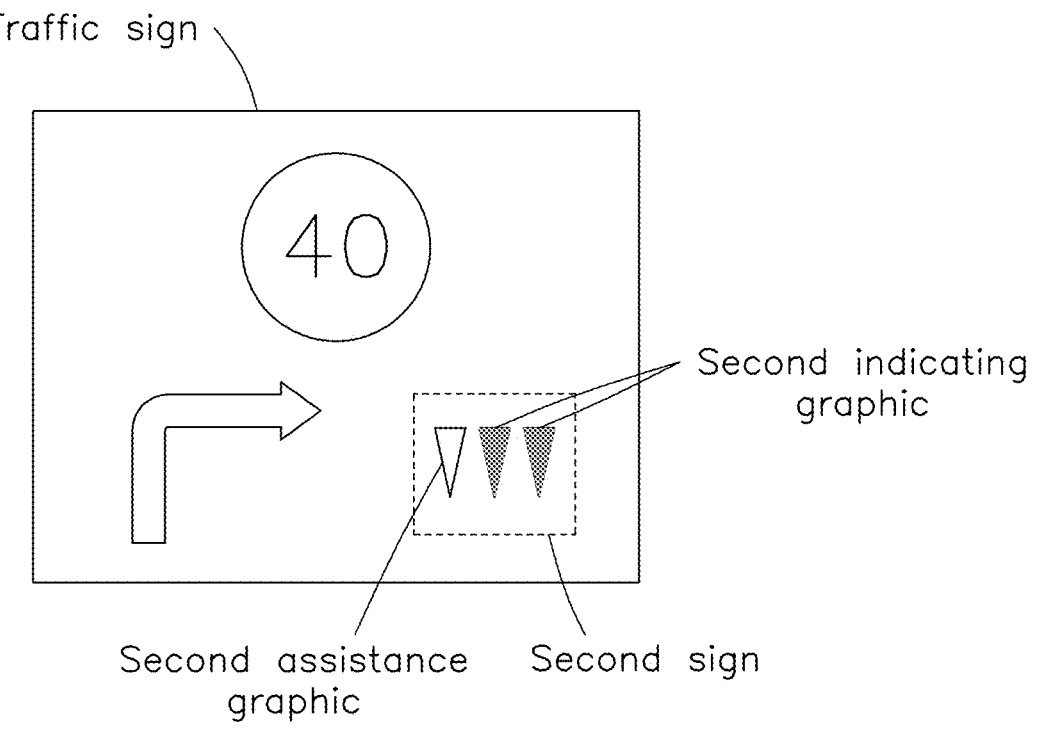
FIG. 7 is a view of an embodiment of a traffic sign, a second sign, and one or more second indicating graphics and one or more second assistance graphics in the second sign.
Figure 8:
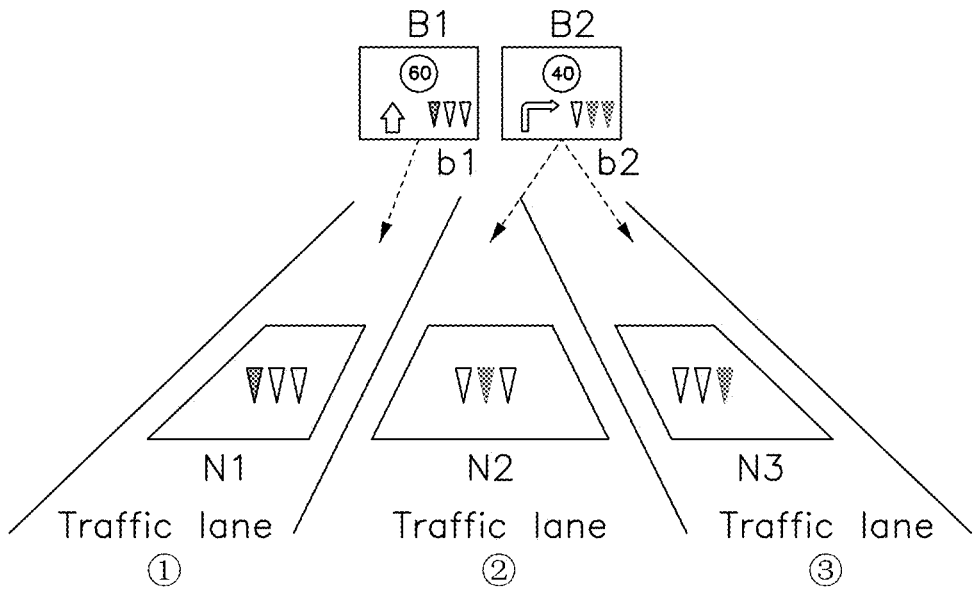
FIG. 8 is a view of an embodiment of correspondence relations between the traffic signs and the traffic lanes in a lane scenario β, where each correspondence relation is reflected via a virtual arrow.

Referring to FIGS. 7-8, in some embodiments, in the image of the travel, each second sign further include one or more second assistance graphics. The one or more second assistance graphics in each second sign are configured to indicate one or more positions of other traffic lanes excluding the at least one traffic lane associated with the corresponding second sign including the one or more second assistance graphics.

Each second indicating graphic in each second sign corresponds to the first indicating graphic in the first sign associated with the second sign. Each second assistance graphic in each second sign corresponds to the first assistance graphic in the first sign associated with the second sign.

A total number of a third number of the one or more second indicating graphics adding a fourth number of the one or more second assistance graphics in the image of the travel in each second sign is the same as a number of the traffic lanes on the road. And, the one or more second indicating graphics and the one or more second assistance graphics in the image of the travel in each second sign can be arranged according to a preset lane sequence. The lane sequence is arranged according to an arrangement sequence of the traffic lanes in the road.

In some embodiments, one or more third positions of the one or more second indicating graphics in the image of the travel in the preset lane sequence can correspond to at least one position of the at least one traffic lane where the corresponding second sign including the corresponding second indicating graphic is on the road. One or more fourth positions of the one or more second assistance graphics in the image of the travel in the preset lane sequence can correspond to one or more positions of other traffic lanes excluding the at least one traffic lane where the corresponding second sign including the one or more second assistance graphics is on the road.

For example, in the image of the travel, in the lane scenario β, the road includes three traffic lanes, and two traffic signs are erected on or above the road. Thus, each second sign is a combination of the three graphics. The combination includes one or more second indicating graphics and one or more second assistance graphics. The one or more second indicating graphics and the one or more first indicating graphics each is a solid triangle. The one or more second assistance graphics and the one or more first assistance graphics each is an open triangle.

Where, in the image of the travel, the traffic sign B1 is associated with the traffic lane ①, thus the second indicating graphic (the solid triangle), the second assistance graphic (the open triangle), the second assistance graphic (the open triangle) are arranged in the second sign b1 according to the lane sequence.

Where, in the image of the travel, the traffic sign B2 is associated with the traffic lane ② and the traffic lane ③, thus the second assistance graphic (the open triangle), the second indicating graphic (the solid triangle), the second indicating graphic (the solid triangle) are arranged in the second sign b1 according to the lane sequence. The two second indicating graphics respectively correspond to the first indicating graphic in the first sign N2 and the first indicating graphic in the first sign N3.

Moreover, when the second sign is associated with all the traffic lanes, all the graphics included in the second sign are the second indicating graphics, and the second sign does not include the one or more second assistance graphics.

Using a setting manner of each second sign, the number of the traffic lanes in the road can be obtained via identifying a total number of the third number of the one or more second indicating graphics adding the fourth number of the one or more second assistance graphics. A detail traffic lane associated with each traffic sign can be obtained via identifying a position of the second indicating graphic in each second sign. Thus, an identifying efficiency of the machine detection can be efficiently improved and it is convenient for the driver to identify during the travel.

The implementation principle of the method according to the embodiment of the present disclosure is described below. The method can identify the first sign on the traffic lane where the vehicle current is and the second signs on the traffic signs from the image of the travel, and match according to a result of the identification, thus the one or more association signs associated with the traffic lane where the vehicle current is are obtained, and the corresponding control signal can be output to the driving system of the vehicle via identifying the one or more association signs.

Thus, in a condition of a number of expansive and complex traffic signs erected on or above the road, the method can accurately detect the traffic sign suitable for the current travel state of the vehicle from the traffic signs, an interference and an influence on the travel of the vehicle by the traffic signs which are not correspond to the traffic lane where the vehicle current is. Thus, an accuracy prompt to a driver or an accuracy control of the travel of the vehicle according to the traffic signs can be achieved.

Figure 9:
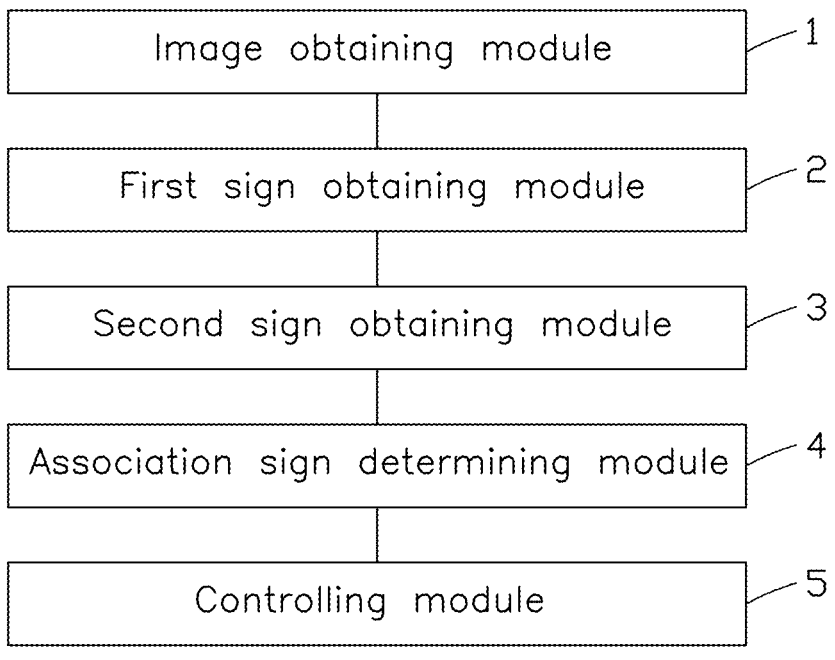
FIG. 9 is a block diagram of an embodiment of a system for identifying traffic signs.

Referring to FIG. 9, a block diagram of an embodiment of a system for identifying traffic signs is shown. The system can include a number of function modules consisting of program code segments. The system can be divided into a number of functional modules, according to the performed functions. The functional modules can include an image obtaining module 1, a first sign obtaining module 2, a second sign obtaining module 3, an association sign determining module 4, and a controlling module 5. The functions of each module will be detailed in the following embodiments.

The image obtaining module 1 is configured to obtain an image of a travel. The image of the travel is the image in front of vehicle captured during a travel of the vehicle. The image of the travel includes one or more traffic lanes, one or more traffic signs, a first sign arranged on each traffic lane, a second sign arranged on each traffic sign, and an indicating sign arranged on each traffic sign. Each second sign is configured to indicate the one or more traffic lanes associated with the traffic sign.

The first sign obtaining module 2 is configured to obtain an image of the first sign corresponding to the traffic lane where the vehicle current is according to the image of the travel.

The second sign obtaining module 3 is configured to obtain an image of the second sign which is associated with the first sign and is on the traffic sign according to the image of the first sign and the image of the travel.

The association sign determining module 4 is configured to determine an image of one or more association signs which associate the traffic lane where the vehicle current is to be an image of the one or more indicating signs which are on the traffic sign where the second sign is according to the image of the second sign and the image of the travel.

The controlling module 5 is configured to output a control signal to a driving system of the vehicle according to content of the image of the one or more association signs.

Due to a function of each block and logical connections between individual aspect blocks themselves, the system provided in the disclosure can achieve the steps of the aforementioned method, and achieve a technical effect the same as the aforementioned method. The principle analysis can refer to a related description of the step of the aforementioned method, and is not described herein.

Figure 10:
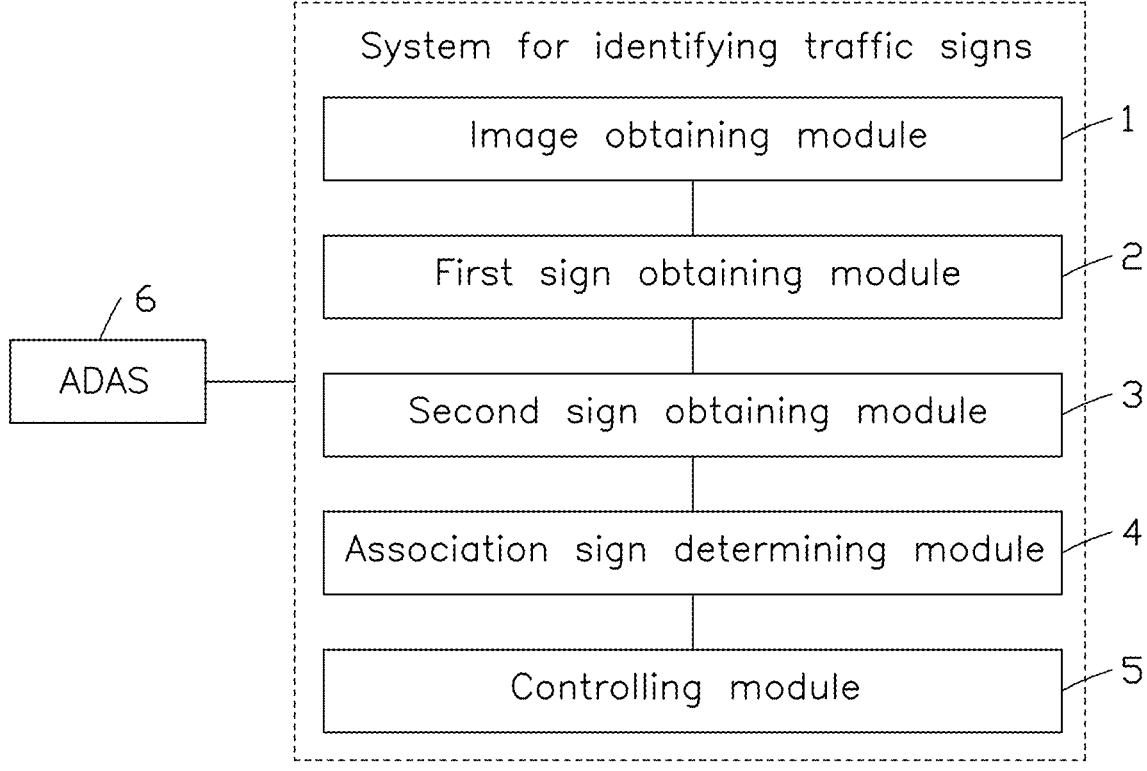
FIG. 10 is a block diagram of an embodiment of a vehicle.

Referring to FIG. 10, FIG. 10 is a block diagram of an embodiment of a vehicle. The vehicle includes a ADAS (Advanced Driving Assistance System) 6 and a system for identifying traffic signs. The ADAS 6 is a driving system of the vehicle. The ADAS 6 is configured to receive the one or more control signals, and control a travel of the vehicle according to the one or more control signals.

In detail, the ADAS 6 can obtain information of the travel state of the vehicle, and control the travel of the vehicle according to the information of the travel state and the one or more control signals.

Where, the information of the travel state is configured to reflect a current state of the travel of the vehicle, a speed of the travel, a direction of the travel, a current lane of the travel, a position of the vehicle, and a planned path. Where, the current state of the travel of the vehicle is the first lane where the vehicle is. The position of the vehicle can be a current position of the vehicle. The position of the vehicle can be obtained via a navigation position module arranged on the vehicle. The planned path is a preset path of the travel of the vehicle, the vehicle should travel along the preset path of the travel.

Via comparing the information of the travel state of the vehicle with the control signal output by the system, whether the current travel state of the vehicle meets a standard of the traffic management indicated by the traffic sign can be analyzed, and the travel state of the vehicle can be accordingly adjusted.

It can be understood that, the traffic sign can be one or more of a group consisting of the speed limit sign and the direction sign of the travel of the lane.

In an application example, when the control signal includes the control signal of the speed limit, and the control signal of the speed limit is speed limit of the lane 40 km/h, the vehicle can analyze whether a current speed of the travel of the vehicle is greater than 40 km/h according to the information of the travel state of the vehicle. If the current speed of the travel of the vehicle is greater than 40 km/h, the vehicle adjusts the current speed of the travel of the vehicle until the current speed of the travel of the vehicle is less than or equal to 40 km/h.

When the control signal includes the control signal of the direction of the travel. The control signal of the direction of the travel indicates the direction of the travel in the current traffic lane, the vehicle can analyze the planned direction of the travel of the vehicle according to the position of the vehicle and the planned path, to determine whether the vehicle needs to change the lane. If the vehicle needs to change the lane, the vehicle adjusts the current direction of the travel of the vehicle until the vehicle moves to an appropriate traffic lane.

Due to a function of each block and logical connections between individual aspect blocks themselves, the vehicle provided in the disclosure can achieve the steps of the aforementioned method, and achieve a technical effect the same as the aforementioned method. The principle analysis can refer to a related description of the step of the aforementioned method, and is not described herein.

Figure 11:
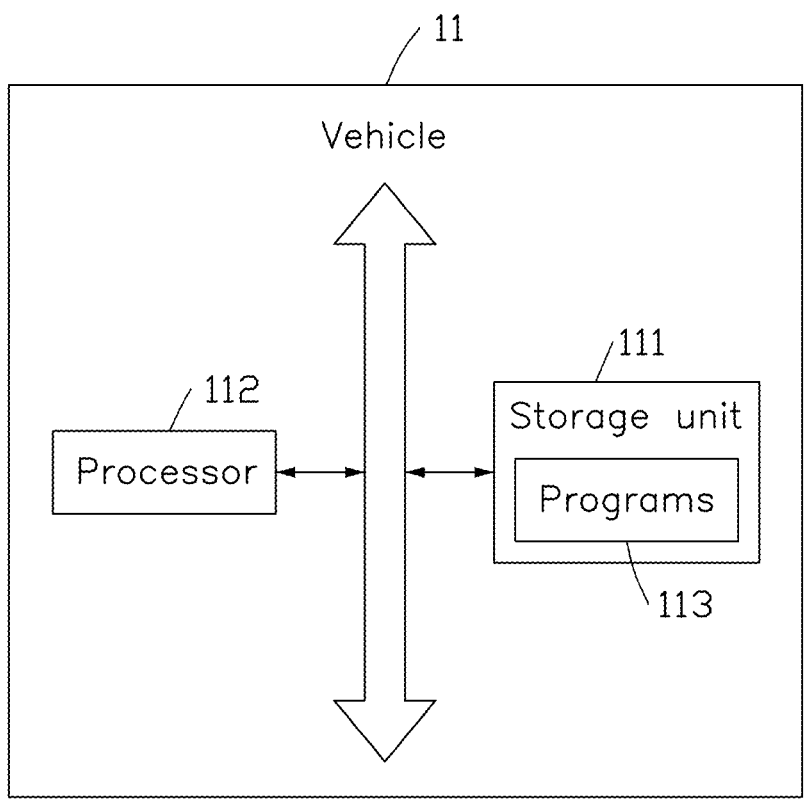
FIG. 11 is a block diagram of another embodiment of a vehicle.

Referring to FIG. 11, FIG. 11 is a block diagram of another embodiment of a vehicle.

The vehicle 11 can include a storage unit 111, at least one processor 112, and one or more programs 113 stored in the storage unit 111 and can be run on the at least one processor 112. The at least one processor 112 can execute the one or more programs 113 to accomplish the steps of the exemplary method.

The one or more programs 113 can be divided into one or more modules/units. The one or more modules/units can be stored in the storage unit 111 and executed by the at least one processor 112 to accomplish the object of the present disclosure. The one or more modules/units can be a series of program instruction segments which can perform specific functions, and the instruction segment is configured to describe the execution process of the one or more programs 113 in the vehicle 11.

A person skilled in the art knows that the vehicle in FIG. 11 is only an example, and does not be considered as limiting of the vehicle 11, the vehicle 11 may include more or fewer parts than the diagram, or combine of certain parts, or includes different parts.

The at least one processor 112 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 112 can be a microprocessor or the at least one processor 112 can be any regular processor, or the like. The at least one processor 112 can be a control center of the vehicle 11, using a variety of interfaces and lines to connect various parts of the entire vehicle 11.

The storage unit 111 stores the one or more programs and/or modules/units. The at least one processor 112 can run or execute the one or more programs and/or modules/units stored in the storage unit 111, call out the data stored in the storage unit 111, and accomplish the various functions of the vehicle 11, for example apply the methods hereinbefore described. The storage unit 111 may include a program area and a data area. The program area can store an operating system, and applications that are required for the at least one function, such as sound playback features, images playback functions, and so on. The data area can store data created according to the use of the vehicle 11, such as video data, audio data, and so on. In addition, the storage unit 111 can include high-speed random access memory and non-transitory storage medium, such as hard disk, memory, plug-in hard disk, smart media card, secure digital, flash card, at least one disk storage device, flash memory, or other transitory storage medium.

If the integrated module/unit of the vehicle 11 is implemented in the form of or by means of a software functional unit and is an independent product sold or used, all parts of the integrated module/unit of the vehicle 11 may be stored in a computer-readable storage medium. The vehicle 11 can use one or more programs to control the related hardware to accomplish all parts of the methods of this disclosure. The one or more programs can be stored in a computer-readable storage medium. The one or more programs can be accomplished the block of the exemplary method when executing by the at least one processor. The one or more stored programs can include program code. The program code can be in the form of source code, object code, executable code file, or in some intermediate form. The computer-readable storage medium may include any entity or device capable of recording and carrying the program codes, recording media, USB flash disk, mobile hard disk, disk, computer-readable storage medium, read-only memory, Random access memory, electrical carrier signals, telecommunications signals, and software distribution package. The content stored in the computer-readable storage medium can be increased or decreased in accordance with legislative requirements and regulations of patent practice jurisdictions, for example, in some jurisdictions, legislation and patent practice stipulates that computer-readable storage medium does not include electrical carrier signals or telecommunications signals.

The disclosure further provides a computer readable storage medium configured to store one or more programs. The processor can execute the one or more programs to accomplish the steps of the exemplary method.

A computer readable storage medium may be any medium capable of storing one or more programs, for example, but not limited to, a USB flash disk, a movable hard disk, a read-only memory (ROM), a random access memory (RAM), a Disc, or a disk, and so on.

One or more programs are stored in the computer readable storage medium and one or more programs which when executed by the at least one processor, cause the at least one processor to perform the steps of the aforementioned steps. Thus, the computer readable storage medium can achieve a technical effect the same as the aforementioned method. The principle analysis can refer to a related description of the step of the aforementioned method, and is not described herein.

It should be noted that the embodiments mentioned above are only used to illustrate the technical solutions of the present disclosure but not to limit the technical solutions. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

A person having ordinary skill in the art can appreciate that the above embodiments are only examples of the present disclosure, and do not limit the scope of the present disclosure. Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A method for identifying traffic signs comprising:
obtaining an image of a travel in front of a vehicle, which is captured by a camera of the vehicle during a travel of the vehicle; wherein the image of the travel comprises one or more traffic lanes, one or more traffic signs, one or more first signs, one or more second signs, and one or more indicating signs arranged on each of the one or more traffic signs, wherein each of the one or more first signs is arranged on a corresponding traffic lane of the one or more traffic lanes, each of the one or more second signs is arranged on a corresponding traffic sign of the one or more traffic signs, each of the one or more second signs indicates at least one traffic lane, of the one or more traffic lanes, associated with the corresponding traffic sign;
obtaining an image of a first sign, of the one or more first signs, corresponding to a traffic lane, of the one or more traffic lanes, wherein the vehicle is on the traffic lane at a time the image of the travel is captured, according to the image of the travel;
obtaining an image of a second sign, of the one or more second signs, wherein the second sign is associated with the first sign and is on a traffic sign, of the one or more traffic signs, according to the image of the first sign and the image of the travel;
designating an image of one or more association signs associated with the traffic lane, as an image of the one or more indicating signs, wherein the image of the one or more indicating signs, in addition to the second sign, are on the traffic sign, according to the image of the second sign and the image of the travel; and
outputting a control signal to a driving system of the vehicle according to content of the image of the one or more association signs;
wherein each of the one or more first signs in the image of the travel comprises a first indicating graphic, the first indicating graphic indicates a position of a traffic lane, of the one or more traffic lanes, corresponding to a corresponding first sign, of the one or more first signs, on a road containing the one or more traffic lanes; and each of the one or more first signs in the image of the travel further comprises one or more first assistance graphics indicating one or more positions of traffic lanes, of the one or more traffic lanes, excluding the traffic lane indicated in the first indicating graphic.

2. The method according to claim 1, wherein obtaining the image of the second sign further comprises:
designating a lane of the travel, of the one or more traffic lanes, where the vehicle is on at the time the image of the travel is captured, as a target association lane, corresponding to the image of the first sign;
determining one or more association lanes, of the one or more traffic lanes, corresponding to each of the one or more traffic signs in the image of the travel according to the one or more second signs on the one or more traffic signs in the image of the travel;
associating the image of the second sign with the first sign to be the image of the second sign on a target traffic sign of the target association lane in response to the target association lane is one of the association lanes.

3. The method according to claim 2, wherein:
the target association lane being matched with the lane of the travel represents that the target association lane and the lane of the travel indicate the same traffic lane.

4. The method according to claim 1, wherein:
each of the one or more second signs in the image of the travel comprises one or more second indicating graphics, the one or more second indicating graphics are configured to reflect one or more first indicating graphics, the one or more indicating graphics being at least one indicating graphic of the at least one traffic lane associated with a corresponding second sign.

5. The method according to claim 1, wherein:
the first indicating graphic and the first assistance graphics are distinguished via different filling levels; the first indicating graphic is a solid graphic, and each first assistance graphic is an open triangle; in a same first sign, an arrange sequence of the first indicating graphic and the first assistance graphics indicate the positions of all traffic lanes on the road.

6. The method according to claim 5, wherein:
a total number, which is added by a first number of the first indicating graphic with a second number of the one or more first assistance graphics; wherein the first indicating graphic and the one or more first assistance graphics are included in the image of the travel in each of the one or more first signs; is same as a number of the traffic lanes on the road; wherein in a same first sign, the first indicating graphic and the one or more first assistance graphics are arranged according to a preset lane sequence;
a first position of the first indicating graphic in the preset lane sequence corresponds to the position of one of the traffic lanes on the road, where the corresponding first sign is located at;
one or more second positions of the one or more first assistance graphics in the preset lane sequence corresponds to one or more positions of other the rest of the traffic lanes on the road.

7. The method according to claim 4, wherein:
each of the one or more second signs in the image of the travel further comprises one or more second assistance graphics, the one or more second assistance graphics in each of the one or more second signs are configured to indicate one or more positions of other traffic lanes excluding the at least one traffic lane associated with the corresponding second sign, the corresponding second sign comprising the one or more second assistance graphics; the second indicating graphic and the second assistance graphics are distinguished via different filling levels; the second indicating graphic is a solid graphic, and each second assistance graphic is an open triangle; in a same second sign, an arrange sequence of the second indicating graphic and the second assistance graphics indicate the positions of all traffic lanes on the road;

a total number, which is added by a third number of the one or more second indicating graphics with a fourth number of the one or more second assistance graphics; wherein the second indicating graphic and the one or more second assistance graphics are included in the image of the travel in each of the one or more second signs; is same as a number of the traffic lanes on the road; wherein in a same first sign, the one or more second indicating graphics and the one or more second assistance graphics are arranged according to a preset lane sequence;

one or more third positions of the one or more second indicating graphics in the preset lane sequence corresponds to at least one position of at least one traffic lane of the traffic lanes on the road, where the corresponding second sign is located at;

one or more fourth positions of the one or more second assistance graphics in the image of the travel in the preset lane sequence corresponds to one or more positions of the rest of the traffic lanes on the road.

8. A vehicle comprising:

a storage device;

at least one processor; and the storage device storing one or more programs, which when executed by the at least one processor, cause the at least one processor to:

obtain an image of a travel in front of a vehicle, which is captured by a camera of the vehicle during a travel of the vehicle; wherein the image of the travel comprises one or more traffic lanes, one or more traffic signs, one or more first signs, one or more second signs, and one or more indicating signs arranged on each of the one or more traffic signs, wherein each of the one or more first signs is arranged on a corresponding traffic lane of the one or more traffic lanes, each of the one or more second signs is arranged on a corresponding traffic sign of the one or more traffic signs, each of the one or more second signs indicates at least one traffic lane, of the one or more traffic lanes, associated with the corresponding traffic sign;

obtain an image of a first sign, of the one or more first signs, corresponding to a traffic lane, of the one or more traffic lanes, wherein the vehicle is on the traffic lane at a time the image of the travel is captured, according to the image of the travel;

obtain an image of a second sign, of the one or more second signs, wherein the second sign is associated with the first sign and is on a traffic sign, of the one or more traffic signs, according to the image of the first sign and the image of the travel;

designate an image of one or more association signs associated with the traffic lane, as an image of the one or more indicating signs, wherein the image of the one or more indicating signs, in addition to the second sign, are on the traffic sign, according to the image of the second sign and the image of the travel; and output a control signal to a driving system of the vehicle according to content of the image of the one or more association signs;

wherein each of the one or more first signs in the image of the travel comprises a first indicating graphic, the first indicating graphic indicates a position of a traffic lane, of the one or more traffic lanes, corresponding to a corresponding first sign, of the one or more first signs, on a road containing the one or more traffic lanes; and each of the one or more first signs in the image of the travel further comprises one or more first assistance graphics indicating one or more positions of traffic lanes, of the one or more traffic lanes, excluding the traffic lane indicated in the first indicating graphic.

9. The vehicle according to claim 8, further causing the at least one processor to:

designate a lane of the travel, where the vehicle is on at the time the image of the travel is captured, as a target association lane, corresponding to the image of the first sign;

determine one or more association lanes, of the one or more traffic lanes, corresponding to each of the one or more traffic signs in the image of the travel according to the one or more second signs on the one or more traffic signs in the image of the travel;

associate the image of the second sign with the first sign to be the image of the second sign on the a target traffic sign of the target association lane in response to the target association lane is one of the association lanes.

10. The vehicle according to claim 9, wherein:

the target association lane being matched with the lane of the travel represents that the target association lane and the lane of the travel indicate the same traffic lane.

11. The vehicle according to claim 8, wherein:

each of the one or more second signs in the image of the travel comprises one or more second indicating graphics, the one or more second indicating graphics are configured to reflect one or more first indicating graphics, the one or more indicating graphics being at least one indicating graphic of the at least one traffic lane associated with a corresponding second sign.

12. The vehicle according to claim 11, wherein:

the first indicating graphic and the first assistance graphics are distinguished via different filling levels; the first indicating graphic is a solid graphic, and each first assistance graphic is an open triangle; in a same first sign, an arrange sequence of the first indicating graphic and the first assistance graphics indicate the positions of all traffic lanes on the road.

13. The vehicle according to claim 12, wherein:

a total number, which is added by a first number of the first indicating graphic with a second number of the one or more first assistance graphics; wherein the first indicating graphic and the one or more first assistance graphics are included in the image of the travel in each of the one or more first signs is same as a number of the traffic lanes on the road; wherein in a same first sign, the first indicating graphic and the one or more first assistance graphics are arranged according to a preset lane sequence;

a first position of the first indicating graphics in the preset lane sequence corresponds to the position of one of the traffic lanes on the road, where the corresponding first sign is located at;

one or more second positions of the one or more first assistance graphics in the preset lane sequence corresponds to one or more positions of the rest of the traffic lanes on the road.

14. The vehicle according to claim 11, wherein:

each of the one or more second signs in the image of the travel further comprises one or more second assistance graphics, the one or more second assistance graphics in each of the one or more second signs are configured to indicate one or more positions of other traffic lanes excluding the at least one traffic lane associated with the corresponding second sign, the corresponding second sign comprising the one or more second assistance graphics; the second indicating graphic and the second assistance graphics are distinguished via different filling levels; the second indicating graphic is a solid graphic, and each second assistance graphic is an open triangle; in a same second sign, an arrange sequence of the second indicating graphic and the second assistance graphics indicate the positions of all traffic lanes on the road;

a total number, which is added by a third number of the one or more second indicating graphics with a fourth number of the one or more second assistance graphics; wherein the second indicating graphic and the one or more second assistance graphics are included in the image of the travel in each of the one or more second signs is same as a number of the traffic lanes on the road; wherein in a same first sign, the one or more second indicating graphics and the one or more second assistance graphics are arranged according to the preset lane sequence;

one or more third positions of the one or more second indicating graphics in the preset lane sequence corresponds to at least one position of at least one traffic lane of the traffic lanes on the road, where the corresponding second sign is located at;

one or more fourth positions of the one or more second assistance graphics in the image of the travel in the preset lane sequence corresponds to one or more positions of the rest of the traffic lanes on the road.

15. A non-transitory storage medium storing a set of commands, when the commands being executed by at least one processor of a vehicle, causing the at least one processor to:

obtain an image of a travel in front of a vehicle, which is captured by a camera of the vehicle during a travel of the vehicle; wherein the image of the travel comprises one or more traffic lanes, one or more traffic signs, one or more first signs, one or more second signs, and one or more indicating signs arranged on each of the one or more traffic signs, wherein each of the one or more first signs is arranged on a corresponding traffic lane of the one or more traffic lanes, each of the one or more second signs is arranged on a corresponding traffic sign of the one or more traffic signs, each of the one or more second signs indicates at least one traffic lane, of the one or more traffic lanes, associated with the corresponding traffic sign;

obtain an image of a first sign, of the one or more first signs, corresponding to a traffic lane, of the one or more traffic lanes, wherein the vehicle current is on the traffic lane at a time the image of the travel is captured, according to the image of the travel;

obtain an image of a second sign, of the one or more second signs, which is wherein the second sign is associated with the first sign and is on a traffic sign, of the one or more traffic signs, according to the image of the first sign and the image of the travel; and designate an image of one or more association signs associated with the traffic lane, as an image of the one or more indicating signs, wherein the image of the one or more indicating signs, in addition to the second sign, are on the traffic sign, according to the image of the second sign and the image of the travel; and output a control signal to a driving system of the vehicle according to content of the image of the one or more association signs;

wherein each of the one or more first signs in the image of the travel comprises a first indicating graphic, the first indicating graphic indicates a position of one traffic lane, of the one or more traffic lanes, corresponding to a corresponding first sign, of the one or more first signs, on a road containing the one or more traffic lanes; and each of the one or more first signs in the image of the travel further comprises one or more first assistance graphics indicating one or more positions of other traffic lanes, of the one or more traffic lanes, excluding the traffic lane indicated in the first indicating graphic.

16. The non-transitory storage medium according to claim 15, further causing the at least one processor to:

designate a lane of the travel, of the one or more traffic lanes, where the vehicle is on at the time the image of the travel is captured, as a target association lane, corresponding to the image of the first sign;

determine one or more association lanes, of the one or more traffic lanes, corresponding to each of the one or more traffic signs in the image of the travel according to the one or more second signs on the one or more traffic signs in the image of the travel;

associate the image of the second sign with the first sign to be the image of the second sign on the a target traffic sign of the target association lane in response to the target association lane is one of the association lanes.

17. The non-transitory storage medium according to claim 16, wherein:

the target association lane being matched with the lane of the travel represents that the target association lane and the lane of the travel indicate the same traffic lane.

18. The non-transitory storage medium according to claim 15, wherein:

each of the one or more second signs in the image of the travel comprises one or more second indicating graphics, the one or more second indicating graphics are configured to reflect one or more first indicating graphics, the one or more indicating graphics being at least one indicating graphic of the at last one traffic lane associated with a corresponding second sign.

19. The non-transitory storage medium according to claim 18, wherein:

the first indicating graphic and the first assistance graphics are distinguished via different filling levels; the first indicating graphic is a solid graphic, and each first assistance graphic is an open triangle; in a same first sign, an arrange sequence of the first indicating graphic and the first assistance graphics indicate the positions of all traffic lanes on the road.

20. The non-transitory storage medium according to claim 19, wherein:

a total number, which is added by a first number of the first indicating graphic with a second number of the one or more first assistance graphics; wherein the first indicating graphic and the one or more first assistance graphics are included in the image of the travel in each of the one or more first signs is same as a number of the traffic lanes on the road; wherein in a same first sign, the first indicating graphic and the one or more first assistance graphics are arranged according to a preset lane sequence;

a first position of the first indicating graphics in the preset lane sequence corresponds to the position of one of the traffic lanes on the road, where the corresponding first sign is located at;

one or more second positions of the one or more first assistance graphics in the preset lane sequence corresponds to one or more positions of the rest of the traffic lanes on the road.

\* \* \* \* \*